(12) United States Patent
Addis

(10) Patent No.: US 7,722,318 B2
(45) Date of Patent: May 25, 2010

(54) HOLE LINERS FOR REPAIR OF VANE COUNTERBORE HOLES

(75) Inventor: Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 713 days.

(21) Appl. No.: 11/706,674

(22) Filed: Feb. 13, 2007

(65) Prior Publication Data
US 2008/0193280 A1 Aug. 14, 2008

(51) Int. Cl.
*F01B 1/04* (2006.01)
(52) U.S. Cl. .................. 415/148; 415/150; 415/159
(58) Field of Classification Search ........... 415/148, 415/150, 159, 160, 161, 162, 208.1, 208.2, 415/209.2, 133
See application file for complete search history.

(56) References Cited

U.S. PATENT DOCUMENTS

| | | | | |
|---|---|---|---|---|
| 3,314,654 | A * | 4/1967 | Thenault et al. | 415/160 |
| 3,999,883 | A * | 12/1976 | Nordenson | 415/113 |
| 4,498,790 | A * | 2/1985 | Fisher | 415/160 |
| 4,808,069 | A * | 2/1989 | Bonner et al. | 415/160 |
| 4,834,613 | A | 5/1989 | Hansen et al. | |
| 4,990,056 | A * | 2/1991 | McClain et al. | 415/160 |
| 5,039,277 | A | 8/1991 | Naudet | |
| 5,421,703 | A | 6/1995 | Payling | |
| 5,569,018 | A | 10/1996 | Mannava et al. | |
| 6,582,191 | B2 * | 6/2003 | Addie et al. | 415/197 |
| 6,688,846 | B2 * | 2/2004 | Caubet et al. | 415/160 |
| 7,112,039 | B2 | 9/2006 | Brooks | |
| 2004/0081554 | A1 | 4/2004 | Bruce | |
| 2004/0120618 | A1 | 6/2004 | Bruce et al. | |
| 2005/0031238 | A1 | 2/2005 | Bruce et al. | |
| 2005/0084190 | A1 | 4/2005 | Brooks et al. | |
| 2005/0232757 | A1 | 10/2005 | Bruce et al. | |
| 2006/0029494 | A1 | 2/2006 | Bruce et al. | |

FOREIGN PATENT DOCUMENTS

EP 1524413 4/2005

* cited by examiner

*Primary Examiner*—Igor Kershteyn
(74) *Attorney, Agent, or Firm*—Kinney & Lange, P.A.

(57) ABSTRACT

A variable vane shroud for a gas turbine engine comprises a cylindrically shaped body, a hole arranged at a circumference of the body, and a counterbore arranged concentrically around the hole on a radially inward facing surface of the body. The hole is for receiving a trunnion from a variable vane and the counterbore is for receiving a hub from the variable vane. A liner is inserted into the hole and counterbore such that the trunnion and hub are provided with a contact surface. The invention also provides a method for repairing a damaged counterbore in a variable vane shroud. A liner having a shape corresponding to a layer of material removed from the shroud is inserted into the void left by removing damaged material such that the counterbore is restored to pre-damaged dimensions.

25 Claims, 7 Drawing Sheets

HOLE LINERS FOR REPAIR OF VANE COUNTERBORE HOLES

BACKGROUND OF THE INVENTION

The present invention is related to gas turbine engines, and in particular to variable vane counterbored holes for engine casings.

Gas turbine engines operate by combusting fuel in compressed air to create heated gases with increased pressure and density. The heated gases are ultimately forced through an exhaust nozzle, which is used to step up the velocity of the exiting gases and in-turn produce thrust for driving an aircraft. In turbofan engines the heated gases are used to drive a turbine for rotating a fan to produce thrust, and to drive a turbine for driving a compressor that provides the compressed air used during combustion. The compressor section of a gas turbine engine typically comprises a series of rotor blade and stator vane stages. At each stage, rotating blades push air past the stationary vanes. Each rotor/stator stage increases the pressure and density of the air. Stators convert the kinetic energy of the air into pressure, and they redirect the trajectory of the air coming off the rotors for flow into the next compressor stage.

The speed range of an aircraft powered by a gas turbine engine is directly related to the level of air pressure generated in the compressor section. For different aircraft speeds, the velocity of the airflow through the gas turbine engine varies. Thus, the incidence of the air onto rotor blades of subsequent compressor stages differs at different aircraft speeds. One way of achieving more efficient performance of the gas turbine engine over the entire speed range, especially at high speed/high pressure ranges, is to use variable stator vanes which can optimize the incidence of the airflow onto subsequent compressor stage blades.

A plurality of variable stator vanes are typically circumferentially arranged between outer and inner diameter shrouds, which are typically manufactured from steel alloys. The vanes typically include trunnion posts at their innermost and outermost diameters that extend through counterbored holes in the shrouds, respectively. Accordingly, it is desirable that the variable vanes have low-friction rotational movement within the counterbores. However, over the course of an engine lifetime, these counterbores become worn and weathered. In addition to normal vane-induced wear, operation in wet and/or salt-rich environments induces corrosion or pitting in the counterbores, which interferes with free rotation of the vane trunnions within the counterbores. In the case of severe wear or corrosion, it can be necessary to replace the entire compressor case or vane shroud in order to restore optimal free rotation to the variable vanes. This is undesirable because these parts are typically very costly due to the high-grade alloys and precision manufacturing necessary to produce these parts. Thus, there is a need for improved methods and systems for reducing or eliminating the effects of wear and corrosion on variable vane counterbored holes.

BRIEF SUMMARY OF THE INVENTION

The present invention is directed toward a vane shroud for a gas turbine engine. The vane shroud comprises a cylindrically shaped body, a hole arranged at a circumference of the body, and a counterbore arranged concentrically around the hole on a radially inward facing surface of the body. The hole is for receiving a trunnion from a variable vane and the counterbore is for receiving a hub from the variable vane. A liner is inserted into the hole and counterbore such that the trunnion and hub are provided with a contact surface. The invention also provides a method for repairing a damaged counterbore in a variable vane shroud. A liner having a shape corresponding to a layer of material removed from the shroud is inserted into the void left by removing damaged material such that the counterbore is restored to pre-damaged dimensions.

DETAILED DESCRIPTION

Figure 1:
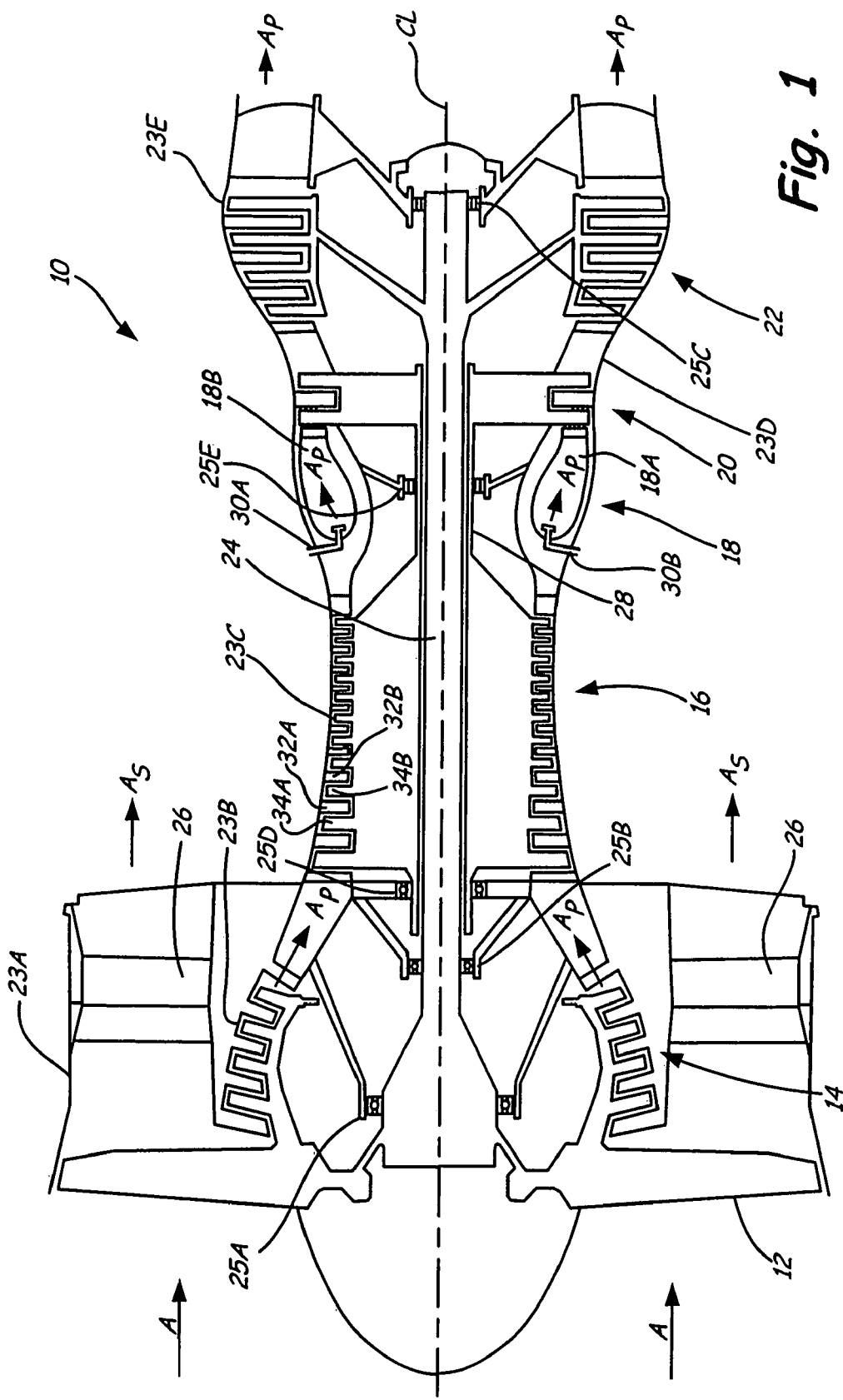
FIG. 1 shows a schematic of a gas turbine engine in which the variable vane hole liners of the present invention are used.

FIG. 1 shows gas turbine engine 10, in which variable vane hole liners are used. Gas turbine engine 10 comprises a dual-spool turbofan engine having variable stator vanes for which the advantages of the hole liners are particularly well illustrated. Gas turbine engine 10 comprises fan 12, low pressure compressor (LPC) 14, high pressure compressor (HPC) 16, combustor section 18, high pressure turbine (HPT) 20 and low pressure turbine (LPT) 22, which are each concentrically disposed around longitudinal engine centerline CL. Fan 12 is enclosed at its outer diameter within fan case 23A. Likewise, the other engine components are correspondingly enclosed at their outer diameters within various engine casings, including LPC case 23B, HPC case 23C, HPT case 23D and LPT case 23E such that an air flow path is formed around centerline CL.

Inlet air A enters engine 10 and it is divided into streams of primary air $A_P$ and secondary air $A_S$ after it passes through fan 12. Fan 12 is rotated by low pressure turbine 22 through shaft 24 to accelerate secondary air $A_S$ (also known as bypass air) through exit guide vanes 26, thereby producing a major portion of the thrust output of engine 10. Shaft 24 is supported within engine 10 at ball bearing 25A, roller bearing 25B and roller bearing 25C. Primary air $A_P$ (also known as gas path air) is directed first into low pressure compressor (LPC) 14 and then into high pressure compressor (HPC) 16. LPC 14 and HPC 16 work together to incrementally step up the pressure of primary air $A_P$. HPC 16 is rotated by HPT 20 through shaft 28 to provide compressed air to combustor section 18. Shaft 28 is supported within engine 10 at ball bearing 25D and roller bearing 25E. The compressed air is delivered to combustors 18A and 18B, along with fuel through injectors 30A and 30B, such that a combustion process can be carried out to produce the high energy gases necessary to turn turbines 20 and 22. Primary air $A_P$ continues through gas turbine engine 10 whereby it is typically passed through an exhaust nozzle to further produce thrust.

In order to expand the performance range of engine 10, variable stator vanes are used in high pressure compressor 16. For example, HPC 16 comprises variable vanes 32A and 32B, which are stationary and extend radially inward from fan case 23C. Blades 34A and 34B, which rotate with HPC 16 on shaft 28, are positioned adjacent vanes 32A and 32B. Vanes 32A and 32B form part of an array of vane stages arranged circumferentially around the engine centerline between HPC case 23C and an inner diameter vane shroud. Blades 34A and 34B sequentially push primary air $A_P$ past vanes 32A and 32B within HPC 16 to increase the pressure of primary air $A_P$. Vanes 32A and 32B rotate about their radial axis to adjust the incidence of the air $A_P$ onto subsequent blades, including blade 34B, during different operation modes, or speeds, of engine 10. In order to ensure optimal operation of engine 10, it is preferable that vanes 32A and 32B are able to rotate freely about their axis within HPC case 23C and the inner diameter vane shroud.

Figure 2:
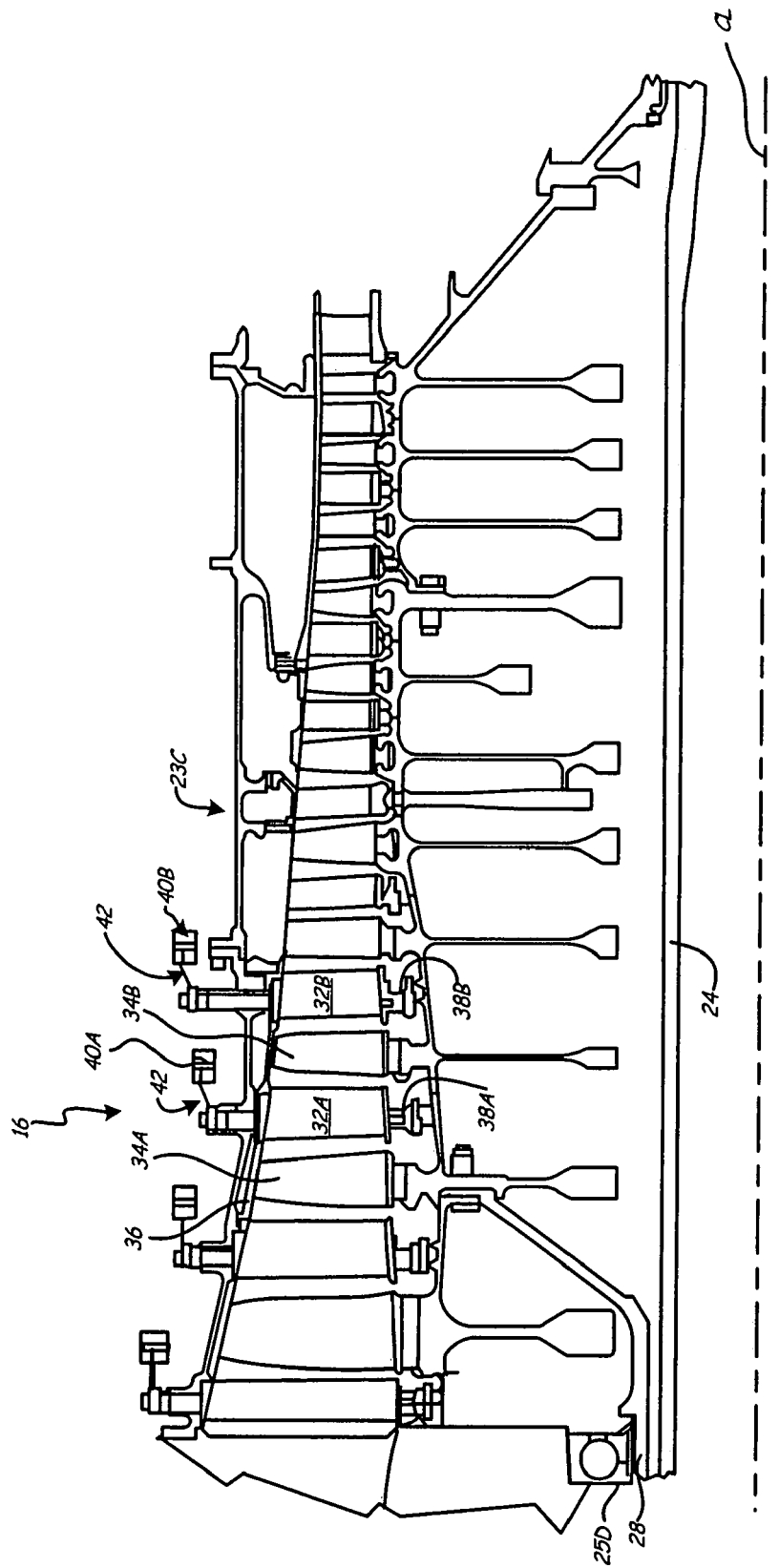
FIG. 2 shows a high pressure compressor section of the gas turbine engine of FIG. 1 showing the interaction between variable stator vanes and a high pressure compressor (HPC) front case.

FIG. 2 shows the sequential arrangement of the various stages of high pressure compressor 16 about centerline CL of gas turbine engine 10. For the embodiment of engine 10 shown, HPC 16 is divided into stages S5 through S15, with LPC 14 of FIG. 1 comprising stages S1 through S4. Vanes 32A and 32B and blades 34A and 34B comprise stages S6 and S7 of HPC 16, respectively. The variable vanes rotate between HPC case 23C and a plurality of inner diameter vane shrouds. Specifically, vanes 32A and 32B rotate between HPC outer shroud 36, which is a component of case 23C, and HPC inner shrouds 38A and 38B, respectively. In order to rotate vanes 32A and 32B within outer shroud 36, vanes 32A and 32B are connected to sync rings 40A and 40B, respectively, through a plurality of sync arms 42. Sync rings 40A and 40B are connected to, for example, a hydraulic actuator to adjust the pitch of vanes 32A and 32B such that airflow through HPC 16 is optimized for different operating levels of engine 10. In order that vanes 32A and 32B rotate freely within outer shroud 36 and inner shrouds 38A and 38B, vanes 32A and 32B include inner and outer diameter trunnions.

Figure 3:
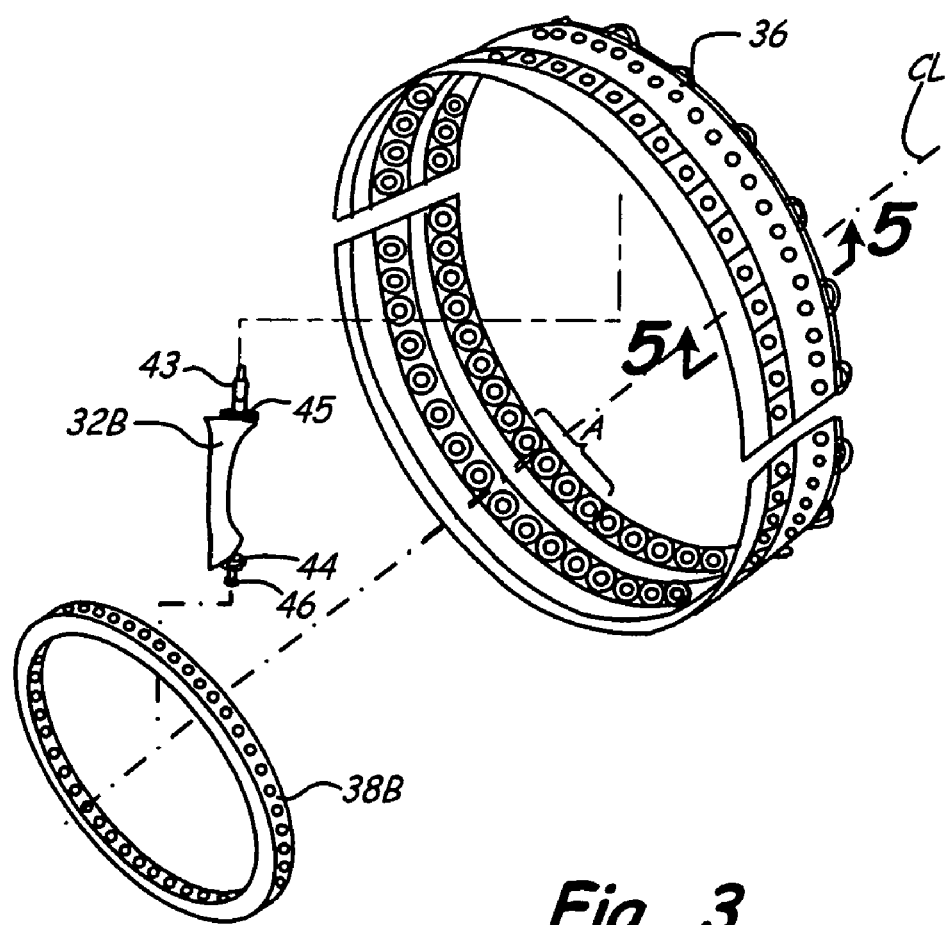
FIG. 3 shows a perspective view of the HPC front case of FIG. 2.

FIG. 3 shows an exploded view of variable vane 32B positioned between outer vane shroud 36 and inner vane shroud 38B. Outer vane shroud 36 and inner vane shroud 38B are positioned concentrically around engine centerline CL at the inner and outer diameters of vane 32B, respectively. Vane shroud 36 comprises a conically shaped body that surrounds stages S6 and S7 of HPC 16, including vanes 32A and 32B and blades 34A and 34B. Vane shroud 36 typically comprises a split-ring construction wherein it is divided into upper and lower halves.

Vane 32B includes outer trunnion 43 and inner trunnion 44 that rotate within variable vane counterbored holes. Using sync ring 40B and sync arms 42 as shown in FIG. 2, vane 32B is rotatable about trunnions 43 and 44 within the counterbored holes in outer vane shroud 36 and inner vane shroud 38B. Additionally, trunnions may include additional features for assisting in true rotation of the variable vanes. For example, vane 32B includes outer diameter hub 45 and inner diameter hub 46 that rotate within the counterbores surrounding the counterbored trunnion holes and help to keep vanes 32B properly aligned. Vane 32A is configured similarly to vane 32B.

As engine 10 progresses into its lifecycle, the counterbores become damaged or worn from use and weather, thus impeding the free rotation of trunnions 43 and 44 within the counterbores, and hubs 45 and 46 against the counterbores. Impediments to the rotation of vanes 32A and 32B can lead to misalignment of the vane pitch along the flow path of engine 10 resulting in sub-optimal operation of HPC 16 and engine 10. Typically, the counterbores begin to show wear after one engine overhaul cycle, with extensive damage appearing typically after 2-3 engine overhaul cycles. In lieu of replacing expensive engine components, such as outer vane shroud 36, after they have worn beyond practical use, the present invention provides a system and method for repairing counterbored holes, principally for variable vanes. Particularly, the repair system and method includes a counterbored hole liner, which can be included in new engine components or can be retrofit into engine components as a fix to damage already sustained. Although hereinafter the invention is described with respect to repairing vane bottom counterbores at the outer diameter end of a high pressure compressor, the repairs can be made to both inner diameter and outer diameter vane shrouds. The repair is particularly well suited to HPC cases, but can also be used for LPC variable vane cases or in any other application using variable vanes.

Figure 4:
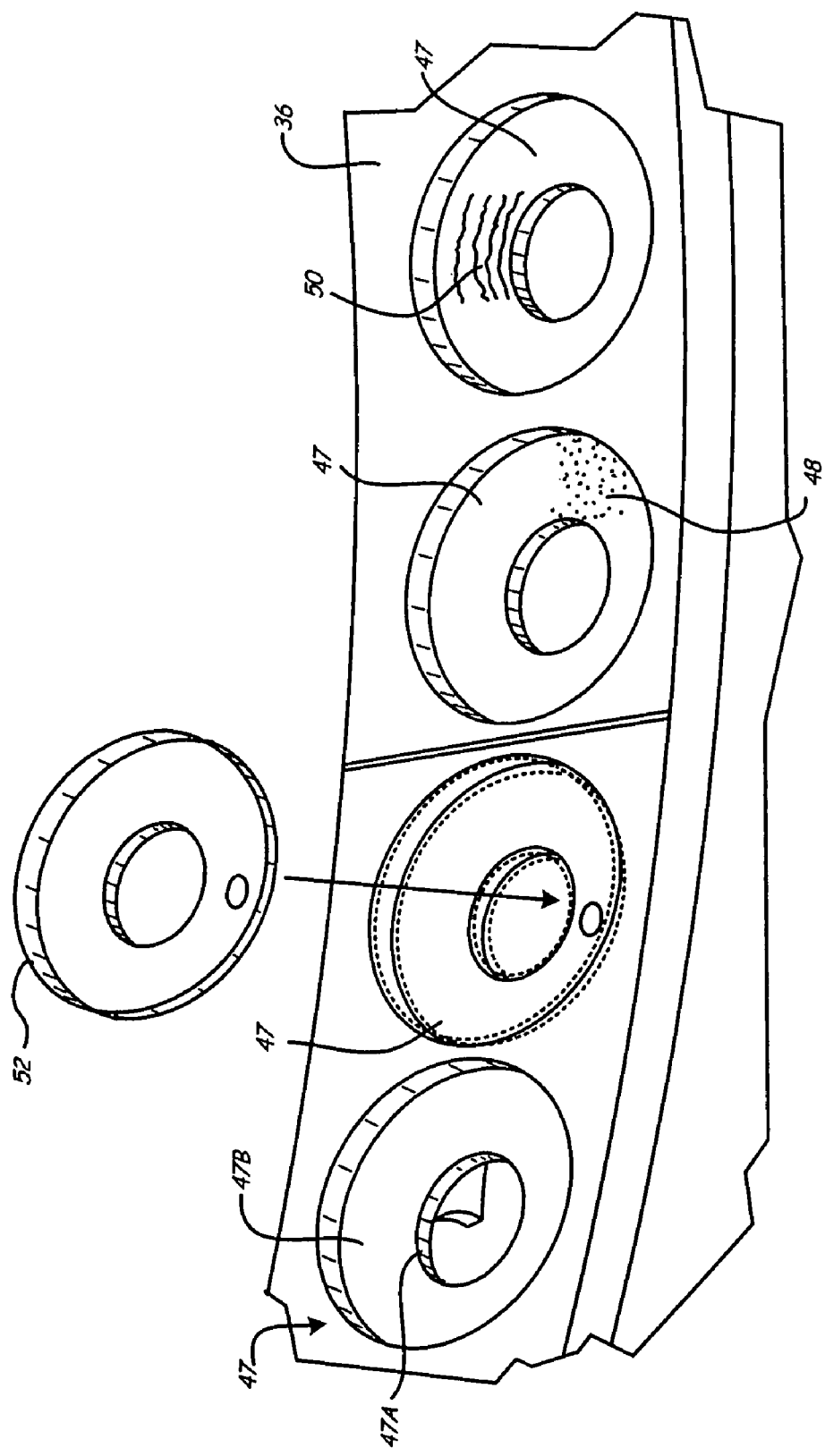
FIG. 4 shows a perspective view of variable vane counterbores in the HPC front case of FIG. 3.

FIG. 4 shows breakout portion A of FIG. 3, showing a perspective view of vane bottom counterbored holes 47, in outer vane shroud 36. Outer vane shroud 36 includes counterbored holes 47 that each receives an outer diameter trunnion from a variable vane, such as trunnion 43 from vane 32B. Counterbored holes 47 comprise hole 47A, which is surrounded by counterbore 47B. Counterbored holes 47 are machined to original design dimensions, free of any pitting, wear or corrosion. However, due to various sources, vane counterbored holes 47 become damaged such that rotation of hub 45 and trunnion 43 is hampered. For example, counterbored holes 47 develop corrosion 48 that arises from harsh operating conditions of engine 10. Corrosion 48 includes pitting or other structural deficiencies of the base material comprising vane shroud 36, which is typically a steel alloy such as an Austenitic steel or another iron-based alloy that builds up oxide layers leading to corrosion. Corrosion 48 arises from the extreme temperatures at which engine 10 operates and other external factors such as salt-rich operational environments. Counterbored holes 47 also develop scoring 50 that arises from routine rotation of trunnion 43 and hub 45 within counterbored holes 47. Corrosion 48 and scoring 50 prevent free rotation of hub 45 on the surface of the counterbore into which they are inserted. As such counterbored holes 47 are provided with hole liner 52. Counterbored holes 47 are over-bored such that any damage is removed from the base material of shroud 36. Subsequently, liner 52, having dimensions matching that of the removed over-bore, is inserted into counterbored holes 47 to restore shroud 36 to original specifications.

Figure 5:
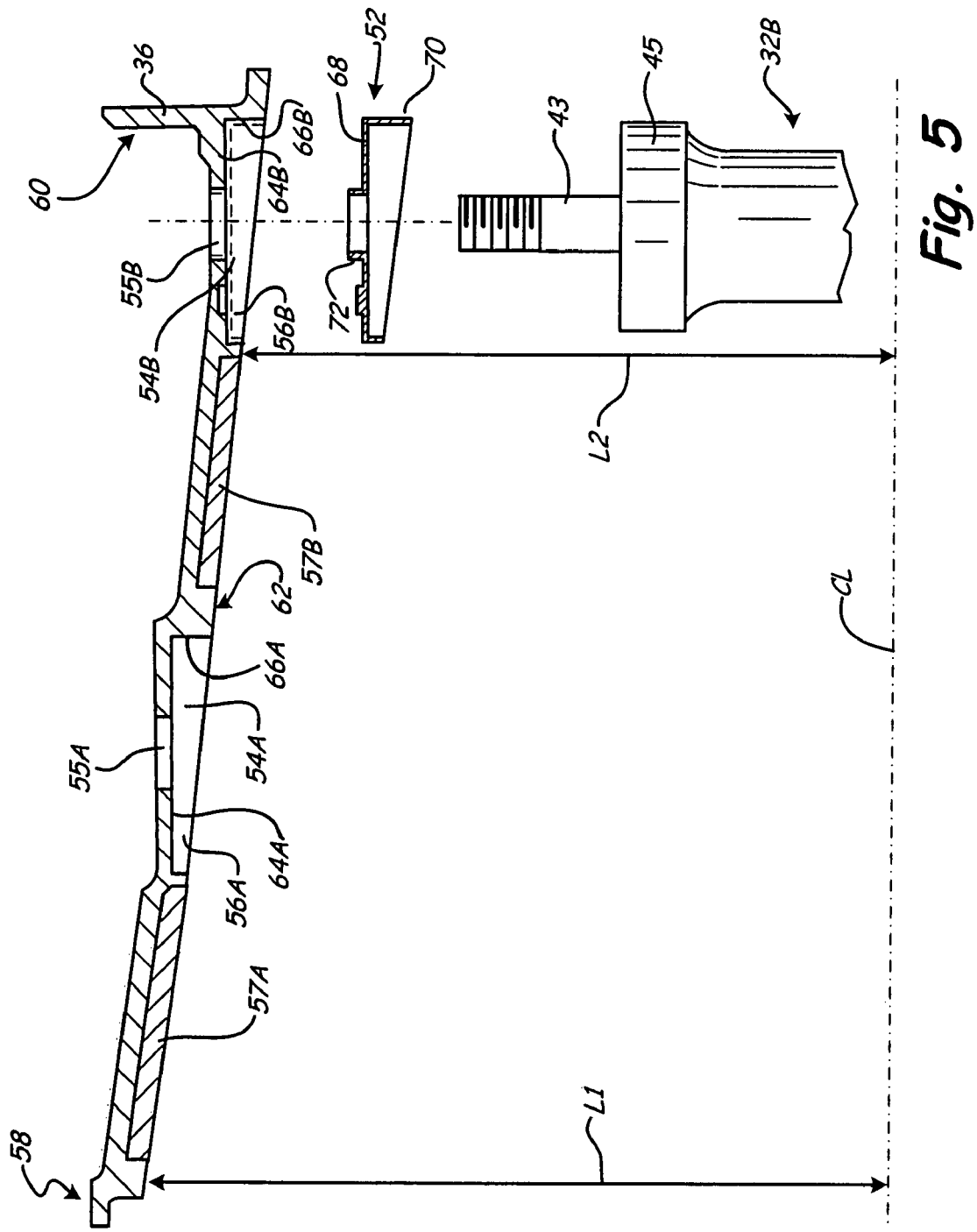
FIG. 5 shows cross section 5-5 of FIG. 3 showing the insertion of a variable vane hole liner into an HPC front case counterbore.

FIG. 5 shows cross section 5-5 of FIG. 3 showing the insertion of counterbored hole liner 52 into outer diameter shroud 36 of HPC case 23C. Outer diameter shroud 36 includes counterbored holes 54A and 54B for receiving trunnions of variable vanes. Counterbored holes 54A and 54B each comprise a trunnion hole 55A and 55B, respectively, extending through shroud 36 and a corresponding counterbore 56A and 56B, respectively, surrounding trunnion holes 55A and 55B, respectively. Outer diameter shroud 36 also includes trenches 57A and 57B against which the outer diameter ends of blades 34A and 34B engage. In various embodiments of shroud 36, trenches 57A and 57B are filled with a plasma-sprayed abradable material. As shown, counterbored hole 54B receives trunnion 43 and hub 45 of vane 32B. In order to facilitate repair of counterbored hole 54A or 54B, shroud 36 is provided with a variable vane hole liner. For example, liner 52, which is an exemplary embodiment of the hole liners, is used in conjunction with counterbored hole 54B.

Vane shroud 36 is generally a conically shaped cylinder such that it is disposed around engine centerline CL with a sloping orientation. Forward end 58 of shroud 36 is disposed length $L_1$ away from centerline CL, whereas aft end 60 is disposed length $L_2$ away from centerline CL. Length $L_1$ is greater than length $L_2$ such that radially innermost surface 62 of shroud 36 slopes toward centerline CL as shroud 36 extends from forward end 58 to aft end 60. However, since vanes 32A and 32B need to abut shroud 36 on a surface conducive to rotation, counterbores 56A and 56B include flat surfaces 64A and 64B, respectively. Thus, counterbores 56A and 56B are machined perpendicularly to centerline CL into surface 62. As such, counterbores 56A and 56B include walls 66A and 66B that are cylindrically shaped and extend from the generally flat surfaces 64A and 64B to the conically shaped surface 62 such that walls 66A and 66B follow the contour of surface 62.

Shroud 36 is typically produced as a single-piece unitary component. Thus, shroud 36 is finished to meet final dimensional tolerances, including the final dimensions of counterbored holes 54A and 54B. Counterbored holes 54A and 54B are typically finished such that they receive trunnion 43 and hub 45 with fairly tight tolerances such that slop is eliminated from the system, depending on design needs. However, due to damage imparted by corrosion and wear discussed above, the dimensions and tolerances of counterbored holes 54A and 54B become altered such that smooth rotation of trunnion 43 and hub 45 is affected. As such, shroud 36 is repaired with hole liner 52.

Figure 6A:
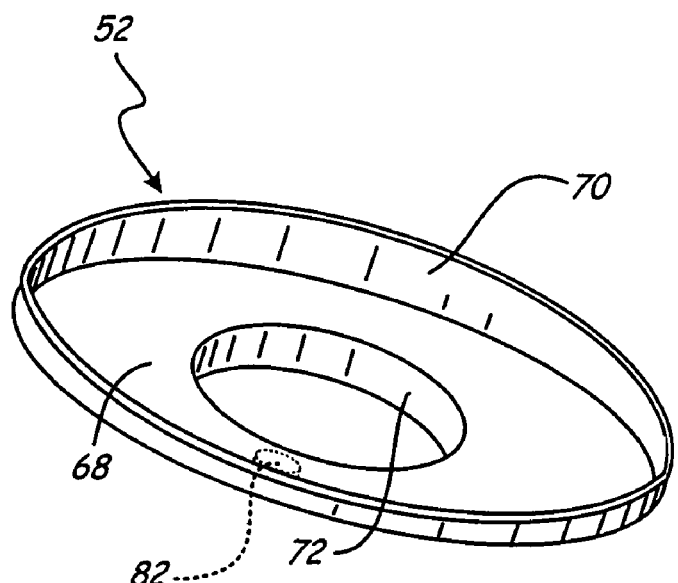
FIG. 6A shows a top perspective view of a variable vane hole liner.
Figure 6B:
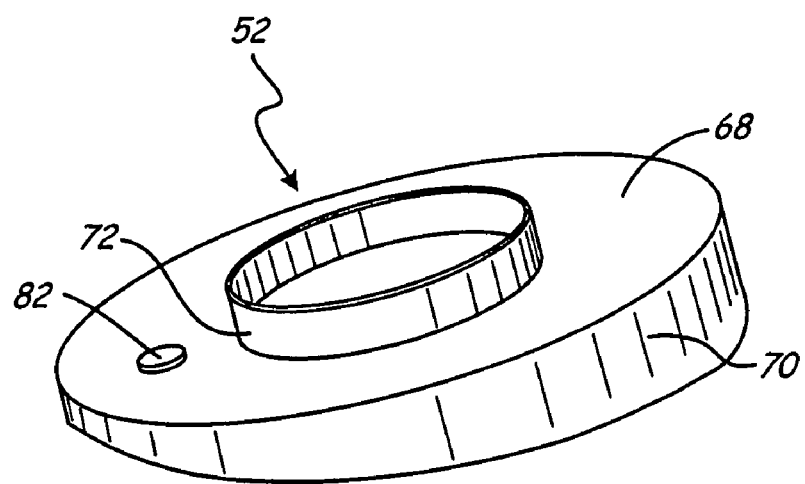
FIG. 6B shows a bottom perspective view of a variable vane hole liner.

FIG. 6A shows a top perspective view of liner 52, and FIG. 6B shows a bottom perspective view of liner 52. Liner 52 is constructed such that counterbored hole 54B can be milled out, or over-bored, to remove the corrosion or damage to counterbored hole 54B. Liner 52 includes flat floor 68, wall 70 and neck 72. As can be seen, wall 70 has a sloping shape that varies around its edge perimeter to match the contour of surface 62.

Liner 52 may be comprised of any material suitable for withstanding the thermal and mechanical stresses associated with shroud 36 during operation of engine 10. In various embodiments, liner 52 is made from a metallic alloy or from an engineered plastic. Any suitable alloy can be used, however, alloys matching that of shroud 36 are particularly suitable. For example, Austenitic stainless steels, such as 300 series stainless; or nickel materials, such as the Inconel family, would also be suitable materials. Polyetheretherketone (PEEK) materials, such as Sustatec® PEEK as is commercially available from Sustaplast, L.P., Edgewood, N.Y.; or PTFE-based materials, such as Rulon® 945 as is commercially available from St. Gobain Performance Plastics, Valley Forge, Pa. are examples of suitable engineered plastics. Rulon® 957, also available from St. Gobain, is another suitable material. For any material selected desirable properties include heat resistance, low friction and strength. Additionally, corrosion resistant material may be selected to reduce recurrence of corrosion damage. Low-friction materials may be selected such that the variable vanes are better able to rotate. Specifically, the material for liner 52 may be selected to have a lower coefficient of friction than that of the material comprising shroud 36. It is preferable that materials be able to sustain temperatures upwards of 600° F., preferably up to about 700° F., which are temperatures commonly reached around HPC 16. It is also desirable to match the thermal expansion rate of the material of liner 52 with that of the material comprising shroud 36. The qualities for shroud 36 can be selected to match design needs depending on performance parameters of engine 10.

Figure 7:
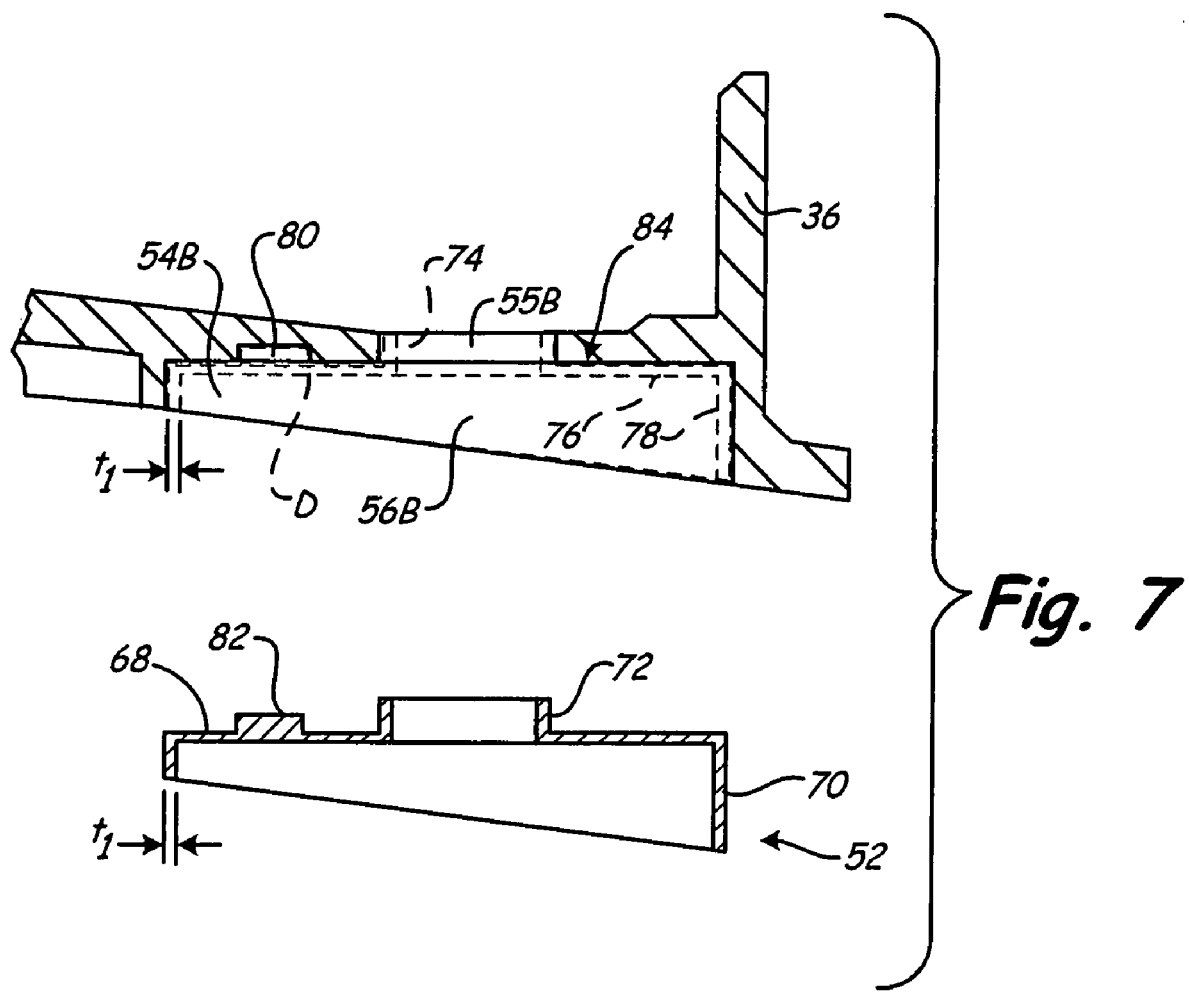
FIG. 7 shows a close-up view of a variable vane hole liner and a variable vane counterbore.

FIG. 7 shows a close-up view of liner 52 for insertion into counterbored hole 54B of outer diameter vane shroud 36. Counterbored hole 54B is machined into shroud 36 such that it is made to specification as is required by design parameters. Counterbored hole 54B extends into shroud 36 such that it is shown in dotted line D in FIG. 7. Counterbored hole 54B includes neck 74, base 76 and wall 78. As described above, counterbored hole 54B undergoes corrosion and wear such that shroud 36 becomes damaged. The damage associated with the corrosion or wear extends into the base material of shroud 36 a particular depth. As such, counterbored hole 54B is machined out, or over-bored, a particular depth to remove the damaged base material such as shown in solid lines in FIG. 7. However, it is not enough to simply remove the damaged material, as any material removal of shroud 36 permits slop in the rotation of vane 32B, which affects the efficiency of IPC 16. A uniform amount of material is removed from counterbored hole 54B such that it can be readily replaced to restore shroud 36 to its original design dimensions. Liner 52 is inserted into the over-bored counterbored hole 54B to restore shroud 36 and counterbored hole 54B to their original dimensions. Thus, liner 52 is made to dimensions that match the amount of material removed from counterbored hole 54B in removing the damaged base material.

Wear and corrosion may occur anywhere along counterbored hole 54B. For example, wall 78 undergoes wear and corrosion such that it becomes damaged to some depth less than or equal to depth $t_1$. Thus, material is uniformly removed from the entirety of wall 78 to depth $t_1$ to ensure all damaged material is removed. Wall 70 of liner 52 is correspondingly manufactured to have a thickness corresponding to depth $t_1$. Likewise, material is removed from around neck 74 and floor 76 to a depth necessary to remove any damaged base material at those locations. Correspondingly, liner 52 is fabricated such that neck 72 and floor 68 have thicknesses matching the amount of material removed from neck 74 and floor 76, which may or may not equal depth $t_1$.

Alternatively, material may be uniformly removed from neck 74, floor 76 and wall 78 to a depth necessary to remove the deepest damage on counterbore 54B, regardless of the location of the damage. In any event, the least amount of material as is practically possible is removed from shroud 36 such that shroud 36 is not thinned-out too much and its structural integrity is not compromised, as the thickness of shroud 36 is generally on the order of about 0.04 inches (~0.1016 cm). As such, the invention is particularly well suited to shallow damage incurred to counterbored hole 54B. Thus, when liner 52 is inserted into over-bored counterbored hole 54B, shroud 36 and counterbore 54B are restored to their original design dimensions.

In order to facilitate and expedite the assembly of liner 52 with counterbored hole 54B, floor 76 has additional material removed to form a void or locating recess 80. Liner 52 is thus fabricated with corresponding button 82 that comprises the negative shape of recess 80 and is positioned on floor 68 on a corresponding location. Locating recess 80 is positioned on floor 76 such that liner 52 can be properly inserted into counterbored hole 54B in only one way. This is particularly advantageous since wall 70 of liner 52 is of varying height to match the varying height of wall 78. Liner 52 would be difficult to rotate within counterbored hole 54B when fully seated due to its thin construction. Thus, in order to prevent misalignment of liner 52, which would interfere with the free rotation of vane 32B in counterbored hole 54B, button 82 prevents liner 52 from becoming fully seated within counterbored hole 54B unless wall 70 is aligned with the slope of wall 78. Also, button 82 prevents any rotation of liner 52 during any processes used to secure liner 52 to shroud 36.

Liner 36 may be secured to shroud 36 in any suitable manner. For example, depending on the material of liner 52, liner 52 may be welded, brazed or glued to shroud 36. In one embodiment, liner 52 is furnace brazed using a foil bonding material. In another embodiment, liner 52 is resistance welded to shroud 36 at surface 84. In other embodiments spot welding or electron beam welding would be suitable, however subsequent machining steps would be needed to remove slag or any other byproducts. For welding methods, shroud 36 and liner 52 can be heat treated to reduce any stress risers produced during the welding process. Regardless of the method selected for securing liner 52 to shroud 36, it is preferable that no subsequent machining steps are required. For engineered plastic liners, high temperature adhesives or glues would be suitable methods for securing liner 52 to shroud 36.

Thus, liner 52 provides an easy, low-cost repair means for repairing variable vane counterbored holes. Repairs following the present invention can be made at most overhaul or repair shops as the repair can be carried out using commonly found equipment such as a mill or welding equipment. Expensive or elaborate equipment, such as a plasma-spray booth, is not required. Also, the invention allows for different repairs to be made to cure the same deficiencies such that each shop can perform a repair method within their capabilities. Also, the present invention allows for selective repair of damaged counterbored holes such that an entire part does not need to be replaced or repaired for a single faulty counterbored hole. Alternatively, the repairs may be made preemptively as part of a preventative maintenance program, such as during routine overhaul cycles. Additionally, the repair process is repeatable without further degrading the properties of the base material of shroud 36, as a counterbored hole repaired according to the present invention could be again subsequently repaired at a later engine overhaul cycle using the same method.

Although the present invention has been described with reference to preferred embodiments, workers skilled in the art will recognize that changes may be made in form and detail without departing from the spirit and scope of the invention.

The invention claimed is:

1. A vane shroud for a gas turbine engine, the vane shroud comprising:
    a cylindrical shaped body;
    a hole arranged at a circumference of the body, wherein the hole is for receiving a trunnion from a variable vane;
    a counterbore arranged concentrically around the hole on a radially inward facing surface of the body, wherein the counterbore is for receiving a hub from the variable vane;
    a recess positioned on a radially inward facing surface of the counterbore;
    a liner inserted into the hole and counterbore such that the trunnion and hub are provided with a contact surface; and
    an anti-rotation feature positioned on a radially outward facing surface of the liner for insertion into the recess.

2. The vane shroud of claim 1 wherein the counterbore and hole are over-sized such that they receive the liner.

3. The vane shroud of claim 2 wherein the liner is inserted into the hole and counterbore to restore the cylindrical shaped body to design dimensions.

4. The vane shroud of claim 2 wherein the counterbore and hole are over-sized by a process used to remove a damaged portion of the body.

5. The vane shroud of claim 2 wherein the liner is inserted into the hole and counterbore such that the hole and counterbore are dimensioned to mate with the trunnion and hub.

6. The vane shroud of claim 1 wherein the anti-rotation feature is insertable into the recess to prevent rotation of the liner within the counterbore.

7. The vane shroud of claim 1 wherein the liner comprises:
    a flat floor portion for engaging the hub;
    a wall extending around a perimeter of the floor portion, and having a profile to match that of the radially inward surface of the body; and
    a neck for receiving the trunnion.

8. The vane shroud of claim 7 wherein the anti-rotation feature is insertable into the recess such that the profile of the wall aligns with the profile of the radially inward facing surface of the body.

9. The vane shroud of claim 1 wherein the liner is secured to the body.

10. The vane shroud of claim 1 wherein the liner is comprised of a material having a lower coefficient of friction than that of the body.

11. The vane shroud of claim 10 wherein the liner comprises at least one of the following materials: a metallic alloy and a plastic.

12. A method for repairing a damaged counterbore in a variable vane shroud, the method comprising:
    removing a layer of base material from the vane shroud around the counterbore to produce a socket such that a damaged portion of the counterbore is removed; and
    inserting a liner having a shape corresponding to the layer of base material removed from the shroud into the socket such that the counterbore is restored to pre-damaged dimensions.

13. The method of claim 12 wherein the step of removing the layer of base material comprises over-boring the counterbore.

14. The method of claim 12 wherein the layer of removed base material comprises removing a cylindrically shaped portion of the base material.

15. The method of claim 12 wherein the counter bore comprises:
    a generally flat floor;
    a wall portion surrounding a perimeter of the floor; and
    a neck portion extending from a hole in a center of the counterbore.

16. The method of claim 15 wherein the step of removing the layer of base material comprises:
    removing material from the wall portion;
    removing material from the floor; and
    removing material from the neck portion.

17. The method of claim 16 wherein the step of removing the layer of base material further comprises producing a locating recess in the floor such that the liner fits within the socket in only one position.

18. The method of claim 16 wherein the step of removing the layer of base material further comprises producing a locating recess in the floor such that a wall portion of the liner aligns with the wall portion of the counterbore.

19. The method of claim 16 wherein the step of removing the layer of base material further comprises producing a locating recess in the floor to prevent rotation of the liner.

20. The method of claim 12 wherein the liner is comprised of a material having a lower coefficient of friction than the base material of the vane shroud.

21. The method of claim 20 wherein the liner comprises at least one of the following materials: a metallic alloy and a plastic.

22. A liner for receiving a trunnion of a variable vane in a compressor fan case, the liner comprising:
- a generally flat floor comprising:
  - a first surface for abutting a base of the trunnion; and
  - a second surface for abutting the compressor fancase;
- a wall portion surrounding a perimeter of the floor and extending from the first surface, wherein the wall is shaped to match a contour of a radially inward facing surface of the fan case;
- a neck portion extending from the second surface and surrounding a hole in a center of the floor, wherein the hole is for receiving the trunnion; and
- an anti-rotation button protruding from the second surface so as to be configured for insertion into a mating locating recess in the fan case.

23. The liner of claim 22 wherein the liner is configured for insertion into a void in the fan case to restore the fan case to design dimensions.

24. The liner of claim 22 wherein the anti-rotation button is spaced from the neck portion and the wall portion in a radial direction, and does not extend around an entire perimeter of the hole in a circumferential direction so as to provide a circumferential alignment feature.

25. The liner of claim 22 wherein the wall portion includes an outer annular surface surrounding the hole and wherein a height of the wall portion between the first surface of the floor and the outer annular surface varies such that the outer annular surface is sloped.

* * * * *

UNITED STATES PATENT AND TRADEMARK OFFICE
CERTIFICATE OF CORRECTION

| | | |
|---|---|---|
| PATENT NO. | : 7,722,318 B2 | Page 1 of 1 |
| APPLICATION NO. | : 11/706674 | |
| DATED | : May 25, 2010 | |
| INVENTOR(S) | : Mark E. Addis | |

It is certified that error appears in the above-identified patent and that said Letters Patent is hereby corrected as shown below:

Col. 6, line 17,
　　delete "IPC"
　　insert --HPC--

Signed and Sealed this
Twenty-second Day of February, 2011

David J. Kappos
*Director of the United States Patent and Trademark Office*